(12) United States Patent
Hentschke

(10) Patent No.: US 12,551,976 B2
(45) Date of Patent: Feb. 17, 2026

(54) METHOD AND PROCESSING ASSEMBLY FOR PROCESSING PROFILE BEAM PARTS EACH EXTENDING ALONG A LONGITUDINAL AXIS

(71) Applicant: Voortman Steel Machinery Holding B.V., Rijssen (NL)

(72) Inventor: Paul Hentschke, Borne (NL)

(73) Assignee: Voortman Steel Machinery Holding B.V., Rijssen (NL)

( * ) Notice: Subject to any disclaimer, the term of this patent is extended or adjusted under 35 U.S.C. 154(b) by 937 days.

(21) Appl. No.: 17/431,546

(22) PCT Filed: Mar. 9, 2020

(86) PCT No.: PCT/NL2020/050154
§ 371 (c)(1),
(2) Date: Aug. 17, 2021

(87) PCT Pub. No.: WO2020/185075
PCT Pub. Date: Sep. 17, 2020

(65) Prior Publication Data
US 2022/0226950 A1 Jul. 21, 2022

(30) Foreign Application Priority Data
Mar. 8, 2019 (NL) ..................................... 2022699

(51) Int. Cl.
*B23Q 7/04* (2006.01)
*B23D 47/04* (2006.01)

(52) U.S. Cl.
CPC ........... *B23Q 7/042* (2013.01); *B23D 47/042* (2013.01)

(58) Field of Classification Search
CPC .............................. B23D 47/042; B23Q 7/042
See application file for complete search history.

(56) References Cited

U.S. PATENT DOCUMENTS 4,463,845 A * 8/1984 Harris .................... B65G 43/08
198/341.02
7,228,881 B1 * 6/2007 Smith ...................... B27M 1/08
144/193.1

(Continued)

FOREIGN PATENT DOCUMENTS

KR 10-2011-0131332 A 12/2011

OTHER PUBLICATIONS

International Search Report, issued in PCT/NL2020/050154, dated Jun. 29, 2020.

(Continued)

*Primary Examiner* — Liang Dong
(74) *Attorney, Agent, or Firm* — Birch, Stewart, Kolasch & Birch, LLP

(57) ABSTRACT

A method for processing profile beam parts includes providing a machining station, an in-feed transport system, and an out-feed transport system. The method further includes transporting and in-feeding a first profile beam part together with a second profile beam part to the machining station, machining at least the first profile beam part in the machining station, out-feeding the first profile beam part with the out-feed transport system from the machining station to an intermediate position which is at a variable distance X from a discharge position between the machining station and the discharge position, and in-feeding the second profile beam part in the machining station with the in-feed transport system over a distance Y and simultaneously out-feeding the first profile beam part over the distance X from the intermediate position to the discharge position. The capacity of the system is improved with the method.

12 Claims, 2 Drawing Sheets

(56) References Cited

U.S. PATENT DOCUMENTS

2011/0195159 A1\* 8/2011 Parker ................. A22C 7/0007
426/89
2016/0346851 A1\* 12/2016 Maki-Haapoja ..... G01B 11/043

OTHER PUBLICATIONS

Written Opinion of the International Searching Authority, issued in PCT/NL2020/050154, dated Jun. 29, 2020.

\* cited by examiner

METHOD AND PROCESSING ASSEMBLY FOR PROCESSING PROFILE BEAM PARTS EACH EXTENDING ALONG A LONGITUDINAL AXIS

FIELD

The invention relates to a method and a processing assembly for processing profile beam parts each extending along a longitudinal axis.

BACKGROUND

In order to reduce the processing time, commercial machining stations for processing profile beam parts are usually not fed by hand. Typically such a machining station is connected to an in-feed transport system for transporting and in-feeding the profile beam parts along their longitudinal axes to the machining station, and an out-feed transport system for out-feeding the profile beam parts along their longitudinal axes away from the machining station.

A typical method for operating such a known machining station starts with in-feeding a first profile beam part together with a second profile beam part in the machining station. Take for example a single profile beam in mind which has to be sawn in two or more profile beam parts. Before the sawing, the single profile beam comprises the first profile beam part and the second profile beam part as one single integral profile beam. After said first in-feeding, at least the first profile beam part is machined, e.g. the first profile beam part is sawed off. Subsequently the machined or sawed off first profile beam part is out-feed from the machining station and transported to a discharge position by the out-feed transport system. When the first profile beam part reaches the discharge position it is discharged from the out-feed transport system to e.g. a storage buffer or to another transport system. After the first profile beam part is discharged from the out-feed transport system, the in-feed transport system in-feeds the second profile beam part to the machining station for machining and the method cycle restarts.

KR 2011 0131332 A discloses a band saw machine having a saw band upstream of which the machine has a front clamp and downstream of which the machine has a rear clamp both for clamping a workpiece part. The front clamp and the rear clamp are movable in a longitudinal direction of the workpiece parts to transfer these workpiece parts so as to move the parts apart from each other away from the saw band. The front clamp is also used to move a subsequent workpiece part into a position in which a subsequent saw cut has to be made. It is disclosed that the second work piece part which has been separated from the first work piece part by the saw band is automatically removed. How this removal is effected and during which time period is not disclosed in KR'332.

SUMMARY OF THE INVENTION

It is an object of the invention to provide a method for processing profile beam parts with a reduced processing time.

To that end, the invention provides a method according to claim 1 for processing profile beam parts each extending along a longitudinal axis. More particular, the method according to the invention comprises providing a machining station, and providing an in-feed transport system for transporting the profile beam parts along a transport direction axis to the machining station. The method further comprises providing an out-feed transport system for transporting the profile beam parts along the transport direction axis away from the machining station to a discharge position which is at a distance D from the machining station. The method further comprises in-feeding a first profile beam part simultaneously together with a second profile beam part to the machining station with the in-feed transport system. During the in-feeding, the profile beam parts are co-linearly aligned along their longitudinal axes. The longitudinal axes are parallel to the transport direction axis. Subsequently, the method comprises machining at least the first profile beam part in the machining station. Subsequently, the method comprises out-feeding the first profile beam part with the out-feed transport system from the machining station to an intermediate position which is between the discharge position and the machining station. A distance X between the intermediate position and the discharge position is variable. During out-feeding, the first profile beam part and the second profile beam part are co-linearly aligned along their longitudinal axes wherein the longitudinal axes remain parallel to the transport direction axis. Finally, the method comprises subsequently in-feeding the second profile beam part in the machining station with the in-feed transport system over a distance Y and simultaneously out-feeding the first profile beam part over the distance X from the intermediate position to the discharge position. During this simultaneous in-feeding and out-feeding the profile beam parts are co-linearly aligned along their longitudinal axes and the longitudinal axes remain parallel to the transport direction axis.

In an embodiment, the distance Y is chosen such that the second profile beam part, after having been moved over distance Y is positioned relative to the machining station in a position in which a subsequent machining on the second profile beam part must be performed.

The known typical methods for processing profile beam parts wait for the first profile beam part to be discharged before in-feeding the second profile beam part. With the method according to the invention, the in-feeding of the second profile beam part is done simultaneously to transporting the first profile beam part along the out-feed transport from the intermediate position to the discharge position. In other words, the second profile beam part is already fed in when the first profile beam part is still traveling the last part along the out-feed transport system. During machining of the second profile beam part, the first profile beam part which is at the discharge position may be discharged from the out-feed transport system. Because the waiting time before in-feeding the second profile beam part is reduced with the method according to the invention, the total processing time will be reduced when compared to the known method described above in the background section. Thus the capacity of the machining station is more effectively used and the total cost price for the processing of a plurality of profile beam parts is reduced. It should be noted that upstream of the machining station, the first profile beam part and the second profile beam part may be an integral part, i.e. parts of a single profile beam.

The invention further provides a processing assembly according to claim 6 for processing profile beam parts each extending along a longitudinal axis. More particular, the invention provides a processing assembly comprising a machining station configured to machine at least a first profile beam part. The processing assembly further comprises an in-feed transport system for transporting and in-feeding the profile beam parts along a transport direction axis to the machining station. The processing assembly additionally comprises an out-feed transport system for out-feeding the profile beam parts along their longitudinal axes in the transport direction away from the machining station. Finally, the processing assembly comprises a controller which is configured:

- to control the in-feed transport system to in-feed a first profile beam part simultaneously together with a second profile beam part to the machining station with the in-feed transport system, wherein during in-feeding the profile beam parts are co-linearly aligned along their longitudinal axes, wherein the longitudinal axes are parallel to the transport direction axis;
- to control the machining station to subsequently machine at least the first profile beam part in the machining station;
- to control the out-feed transport system to subsequently out-feed the first profile beam part with the out-feed transport system from the machining station to an intermediate position which is between the discharge position and the machining station, wherein a distance X between the intermediate position and the discharge position is variable, wherein during out-feeding the first profile beam part and the second profile beam part are co-linearly aligned along their longitudinal axes, wherein the longitudinal axes remain parallel to the transport direction axis; and
- to control the in-feed transport system and the out-feed transport system to subsequently in-feed the second profile beam part in the machining station with the in-feed transport system over a distance Y and simultaneously out-feed and transport the first profile beam part over the distance X from the intermediate position to the discharge position, wherein during this simultaneous in-feeding and out-feeding the profile beam parts are co-linearly aligned along their longitudinal axes, and wherein the longitudinal axes remain parallel to the transport direction axis.

The effects and the advantages of the processing assembly according to the invention are the same as the effects and advantages of the method according to the invention.

The present invention will be further elucidated with reference to figures of an example in which various embodiments of the invention are incorporated. The embodiments may be combined or may be applied separately from each other.

DETAILED DESCRIPTION OF THE FIGURES

Figure 1:
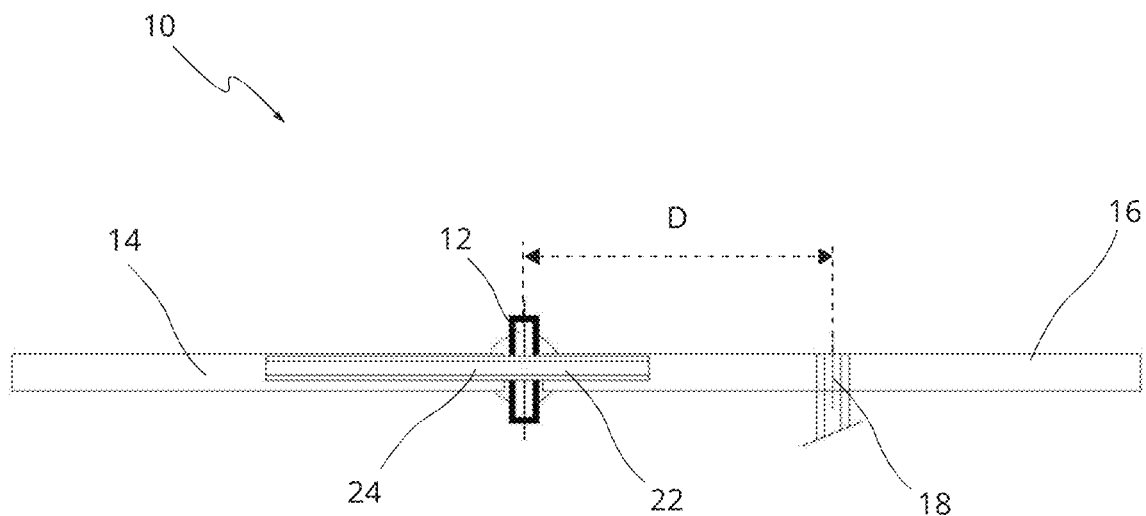
FIG. 1 shows a schematic top view of a processing assembly according to the invention with the first and second profile beam parts still forming an integral profile beam in the machining station.
Figure 2:
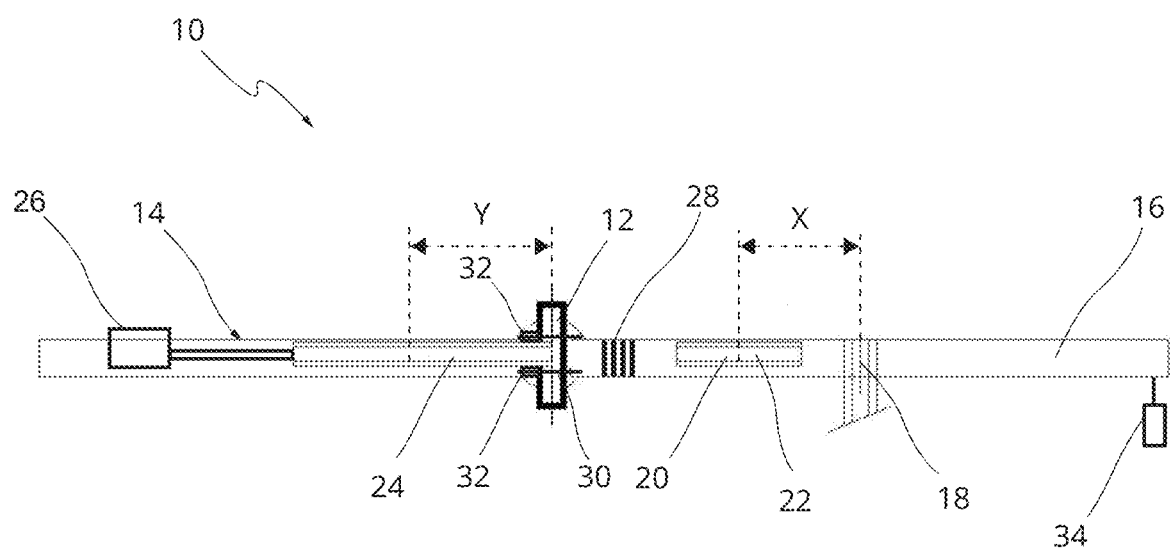
FIG. 2 shows a schematic top view of the processing assembly of FIG. 1 with the first profile beam part in the intermediate position and the second profile beam part in front of the machining station.
Figure 3:
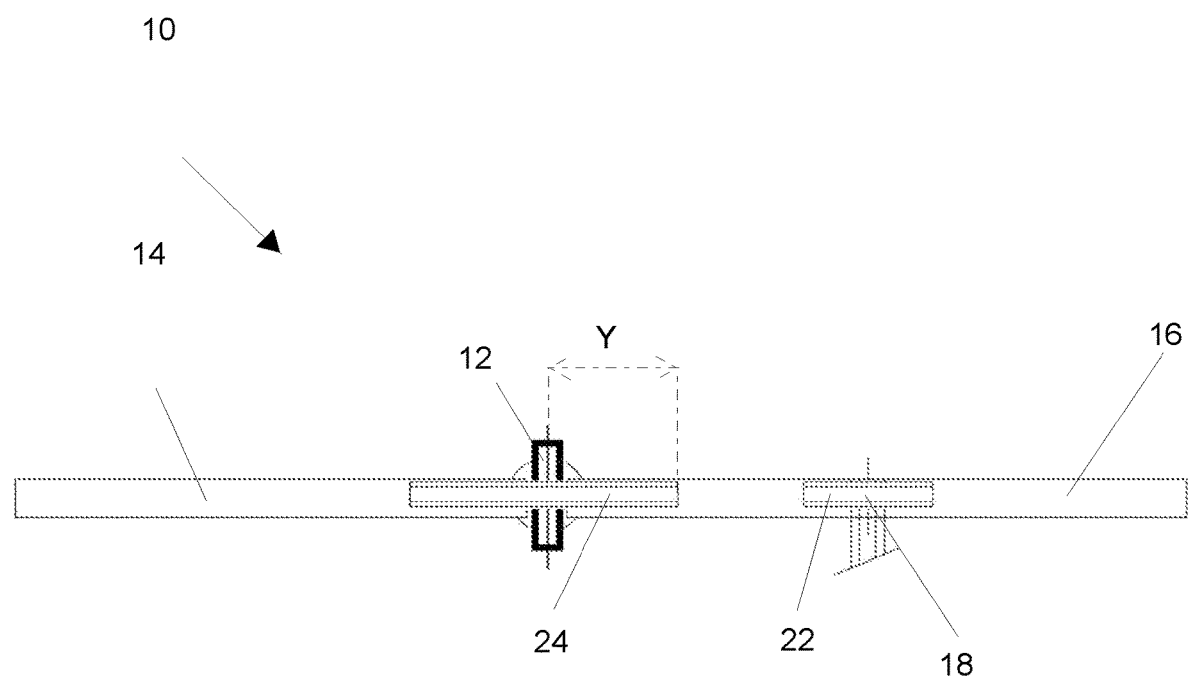
FIG. 3 shows a schematic top view of the processing assembly of FIG. 1 with the first profile beam part in the discharge position and the second profile beam part fed in into the machining station over distance Y.

In this application similar or corresponding features are denoted by similar or corresponding reference signs. The description of the various embodiments is not limited to the example shown in the figures and the reference numbers used in the detailed description and the claims are not intended to limit the description of the embodiments, but are included to elucidate the embodiments by referring to the example shown in the figures.

In the most general terms, the invention relates to a method for processing profile beam parts 22, 24 each extending along a longitudinal axis. The method comprises providing a machining station 12, and providing an in-feed transport system 14 for transporting the profile beam parts 22, 24 along a transport direction axis to the machining station 12. The method further comprises providing an out-feed transport system 16 for transporting the profile beam parts 22, 24 along the transport direction axis away from the machining station 12 to a discharge position 18 which is at a distance D from the machining station 12. The method further comprises:

- in-feeding a first profile beam part 22 simultaneously together with a second profile beam part 24 to the machining station 12 with the in-feed transport system 14, wherein during the in-feeding, the profile beam parts 22, 24 are co-linearly aligned along their longitudinal axes, wherein the longitudinal axes are parallel to the transport direction axis;
- subsequently, machining at least the first profile beam part 22 in the machining station 12;
- subsequently, out-feeding the first profile beam part 22 with the out-feed transport system 16 from the machining station 12 to an intermediate position 20 which is between the discharge position 18 and the machining station 12, wherein a distance X between the intermediate position 20 and the discharge position 18 is variable, wherein during out-feeding, the first profile beam part 22 and the second profile beam part 24 are co-linearly aligned along their longitudinal axes, wherein the longitudinal axes remain parallel to the transport direction axis; and
- subsequently, in-feeding the second profile beam part 24 in the machining station 12 with the in-feed transport system 14 over a distance Y and simultaneously out-feeding the first profile beam part 22 over the distance X from the intermediate position 20 to the discharge position 18, wherein during this simultaneous in-feeding and out-feeding the profile beam parts 22, 24 are co-linearly aligned along their longitudinal axes, and wherein the longitudinal axes remain parallel to the transport direction axis.

The effects and advantages of the method for processing profile beam parts 22, 24 each extending along a longitudinal axis have been described in the summary section and these effects and advantages are incorporated here by reference. It should be noted that upstream of the machining station 12, the first profile beam part 22 and the second profile beam part 24 may be an integral part, i.e. parts of a single profile beam.

In an embodiment, an in-feed transport speed of the in-feed transport system 14 is the same as an out-feed transport speed of the out-feed transport system 16. In that case, the out-feeding of the first profile beam part 22 is executed such that distance X equals to the distance Y. An advantage of having the same in-feed transport speed as out-feed transport speed is that the control of the in-feed transport system 14 and the out-feed transport system 15 can be easily be coordinated. The chance of collision of subsequently fed profile beam parts is minimized.

In an embodiment the method further comprises discharging the first profile beam part 22 from the discharge position 18 and simultaneously machining the second profile beam part 24 in the machining station 12.

By not waiting for the first profile beam part 22 to be discharged in order to machine the second profile beam part 24, additional processing time can be saved. The discharging may, for example, be done in a discharge direction which is perpendicular to the transport direction axis and also perpendicular to the longitudinal axis of the profile beam part 22, 24 which is discharged.

In an embodiment, the machining at least the first profile beam part 22 in the machining station may comprise sawing, drilling, milling, marking, scribing, thread tapping, counter sinking, and/or cutting.

In an embodiment the first profile beam part 22 together with the second profile beam part 24 constitute a single integral profile beam prior to the machining. The machining comprises sawing the integral profile beam into the first profile beam part 22 and the second profile beam part 24 which is distinct from the first profile beam part 22.

The invention also relates to a processing assembly 10 for processing profile beam parts 22, 24 each extending along a longitudinal axis. The processing assembly 10 comprises a machining station 12 configured to machine at least a first profile beam part 24. The processing assembly 10 also comprises an in-feed transport system 14 for transporting and in-feeding the profile beam parts 22, 24 along a transport direction axis to the machining station 12. Further, the processing assembly 10 comprises an out-feed transport system 16 for out-feeding the profile beam parts 22, 24 along their longitudinal axes in the transport direction away from the machining station 12. Finally, the processing assembly comprises a controller which is configured:

to control the in-feed transport system 14 to in-feed a first profile beam part 22 simultaneously together with a second profile beam part 24 to the machining station 12 with the in-feed transport system 14, wherein during in-feeding, the profile beam parts 22, 24 are co-linearly aligned along their longitudinal axes, wherein the longitudinal axes are parallel to the transport direction axis;

to control the machining station 12 to subsequently machine at least the first profile beam part 22 in the machining station 12;

to control the out-feed transport system 16 to subsequently out-feed the first profile beam part 22 with the out-feed transport system 16 from the machining station 12 to an intermediate position 20 which is between the discharge position 18 and the machining station 12, wherein a distance X between the intermediate position 20 and the discharge position 18 is variable, wherein during out-feeding, the first profile beam part 22 and the second profile beam part 24 are co-linearly aligned along their longitudinal axes, wherein the longitudinal axes remain parallel to the transport direction axis; and to control the in-feed transport system 14 and the out-feed transport system 16 to subsequently in-feed the second profile beam part 24 in the machining station 12 with the in-feed transport system 14 over a distance Y and simultaneously out-feed and transport the first profile beam part 22 over the distance X from the intermediate position 20 to the discharge position 18, wherein during this simultaneous in-feeding and out-feeding the profile beam parts 22, 24 are co-linearly aligned along their longitudinal axes, and wherein the longitudinal axes remain parallel to the transport direction axis.

The effects and advantages of the processing assembly for processing profile beam parts 22, 24 each extending along a longitudinal axis have been described in the summary section and these effects and advantages are inserted here by reference.

In an embodiment, an in-feed transport speed of the in-feed transport system 14 is the same as an out-feed transport speed of the out-feed transport system 16. In that situation, the distance X equals to the distance Y. The advantages of this embodiment have been mentioned in the context of the corresponding method embodiment and include that the control of the in-feed transport system 14 and the out-feed transport system 15 can be easily be coordinated. The chance of collision of subsequently fed profile beam parts is minimized.

In an embodiment the machining station 12 may comprise an intermediate transport system 30 which is configured to transport the first and the second profile beam parts 22, 24 through the machining station 12 from the in-feed transport system 14 to the out-feed transport system 16. The intermediate transport system 30 has the advantage of providing support to the profile beam parts 22, 24 while being machined and while being received from the in-feed transport system 12 or while being supplied to the out-feed transport system 16. The intermediate transport system 30 may comprise a clamping system 32 which, in operation, clamps the profile beam parts 22, 24 in the machining station 12 during machining. The clamping system 32 may thus fixate at least the first profile beam part 22 or the second profile beam part 24 during machining.

In an embodiment the in-feed transport system 14 may comprise a gripper truck 26 which, in operation, engages the profile beams parts 22, 24 and transports and in-feeds the profile beam parts 22, 24 to the machining station. The out-feed transport system 16 may comprise a roller conveyor comprising a plurality of transport rollers 28. The roller conveyor may comprise a motor 34 which, in operation, drives at least one of the transport rollers 28. The roller conveyor may out-feed and transport the profile beam parts 22, 24 away from the machining station 12 to the discharge position 18. In alternative embodiments, it is possible to use a gripper truck 26 with the out-feed transport system 16 and/or a driven roller conveyor for the in-feed transport system 14. It is also possible to combine both transportation mechanisms to from one combined transport mechanism for both the in-feed transport system 14 and the out-feed transport system 16. This combined transport mechanism may also be combined with an intermediate transport system 30, to form one continuous transport system throughout the processing assembly 10. It should be noted however, that the drives of the in-feed transport system 14, the optional intermediate transport system 30, and the out-feed transport system 16 should be independently controllable. It is possible to use a single drive for these transport systems, however, then at least a couple/decouple-mechanism should be provided between the drive and the in-feed transport system as well as between the drive and the out-feed transport system. If the intermediate transport system 30 should also be drivable, more particular drivable with the same drive, then also a couple/decouple-mechanism should be provided between the drive and the intermediate transport system 30.

In an embodiment the machining done by the machining station 12 comprises sawing, drilling, milling, marking, scribing, thread tapping, counter sinking, and/or cutting.

The various embodiments which are described above may be implemented independently from one another and may be combined with one another in various ways. The reference numbers used in the detailed description and the claims do

LEGEND

10—processing assembly
12—machining station
14—in-feed transport system
16—out-feed transport system
18—discharge position
20—intermediate position
22—first profile beam part
24—second profile beam part
D—distance between discharge position and machining station
X—distance between intermediate position and discharge position
Y—distance whereover the second profile beam part is in-feeded

The invention claimed is:

1. A method for processing a first profile beam and a second profile beam, each extending along a longitudinal axis thereof, wherein the method comprises:
  providing a machining station;
  providing an in-feed transport system for transporting the first profile beam and the second profile beam along a transport direction axis to the machining station;
  providing an out-feed transport system for transporting the first profile beam and the second profile beam along the transport direction axis away from the machining station to a discharge position at a distance D from the machining station;
  in-feeding the first profile beam simultaneously together with the second profile beam to the machining station with the in-feed transport system, wherein during the in-feeding, the first profile beam and the second profile beam are co-linearly aligned along longitudinal axes thereof, wherein the longitudinal axes are parallel to the transport direction axis;
  subsequently, machining at least the first profile beam in the machining station;
  subsequently, out-feeding the first profile beam with the out-feed transport system from the machining station to an intermediate position between the discharge position and the machining station, wherein a distance X between the intermediate position and the discharge position is variable, wherein during out-feeding, the first profile beam and the second profile beam are co-linearly aligned along the longitudinal axes thereof, wherein the longitudinal axes remain parallel to the transport direction axis; and
  subsequently, in-feeding the second profile beam in the machining station with the in-feed transport system over a distance Y and simultaneously out-feeding the first profile beam over the distance X from the intermediate position to the discharge position, wherein during this simultaneous in-feeding and out-feeding the first profile beam and the second profile beam are co-linearly aligned along the longitudinal axes thereof, and wherein the longitudinal axes remain parallel to the transport direction axis,
  wherein the distance Y is chosen such that the second profile beam, after moving over the distance Y, is positioned relative to the machining station in a position in which a subsequent machining on the second profile beam must be performed, and
  wherein the out-feed transport system and the in-feed transport system simultaneously stop when the first profile beam is at the discharge position and the second profile beam is at the position in which the subsequent machining on the second profile beam must be performed and the first profile beam is discharged from the out-feed transport system.

2. The method according to claim 1, wherein an in-feed transport speed of the in-feed transport system is the same as an out-feed transport speed of the out-feed transport system and wherein the out-feeding of the first profile beam is executed such that the distance X is equal to the distance Y.

3. The method according to claim 1, further comprising discharging the first profile beam from the discharge position and simultaneously machining the second profile beam in the machining station.

4. The method according to claim 1, wherein the machining at least the first profile beam in the machining station comprises sawing, drilling, marking, scribing, thread tapping, counter sinking, and/or cutting milling.

5. A processing assembly for processing a first profile beam and a second profile beam, each extending along a longitudinal axis, wherein the processing assembly comprises:
  a machining station configured to machine at least the first profile beam;
  an in-feed transport system for transporting and in-feeding the first profile beam and the second profile beam along a transport direction axis to the machining station;
  an out-feed transport system for out-feeding the first profile beam and the second profile beam along longitudinal axes thereof in the transport direction away from the machining station, the out-feed transport system comprising a discharge position at a distance D from the machining station for discharging the first profile beam and the second profile beam from the out-feed transport system; and
  a controller configured:
  to control the in-feed transport system to in-feed a first profile beam simultaneously together with a second profile beam to the machining station with the in-feed transport system, wherein during in-feeding, the profile beams are co-linearly aligned along the longitudinal axes thereof, wherein the longitudinal axes are parallel to the transport direction axis;
  to control the machining station to subsequently machine the first profile beam in the machining station;
  to control the out-feed transport system to subsequently out-feed the first profile beam with the out-feed transport system from the machining station to an intermediate position between the discharge position and the machining station, wherein a distance X between the intermediate position and the discharge position is variable, wherein during out-feeding, the first profile beam and the second profile beam are co-linearly aligned along the longitudinal axes thereof, wherein the longitudinal axes remain parallel to the transport direction axis; and
  to control the in-feed transport system and the out-feed transport system to subsequently in-feed the second profile beam in the machining station with the in-feed transport system over a distance Y and simultaneously out-feed and transport the first profile beam over the distance X from the intermediate position to the discharge position, wherein during this simultaneous in-feeding and out-feeding the first profile beam and the second profile beam are co-linearly aligned along the longitudinal axes thereof, and wherein the longitudinal axes remain parallel to the transport direction axis, wherein the distance Y is chosen such that the second profile beam after having been moved over the distance Y is positioned relative to the machining station in a position in which a subsequent machining on the second profile beam must be performed, and to control the infeed-transport system and the out-feed transport system to simultaneously stop the out-feed transport system and the in-feed transport system when the first profile beam is at the discharge position and the second profile beam is at the position in which the subsequent machining on the second profile beam must be performed and the first profile beam is discharged from the out-feed transport system.

6. The processing assembly according to claim 5, wherein an in-feed transport speed of the in-feed transport system is the same as an out-feed transport speed of the out-feed transport system, wherein the distance X is equal to the distance Y.

7. The processing assembly according to claim 5, wherein the machining done by the machining station comprises at least one of sawing, drilling, milling, marking, scribing, thread tapping, counter sinking, and cutting.

8. A method for processing a single integral profile beam, wherein the method comprises:
providing a machining station configured to saw the single integral profile beam to separate the single integral profile beam in a first profile beam part having a longitudinal axis and a distinct second profile beam part having a longitudinal axis;
providing an in-feed transport system for transporting the single integral profile beam along a transport direction axis to the machining station;
providing an out-feed transport system for transporting the first profile beam part and the second profile beam part along the transport direction axis away from the machining station to a discharge position at a distance D from the machining station;
in-feeding the single integral profile beam to the machining station with the in-feed transport system;
subsequently, machining at least the single integral profile beam in the machining station, wherein the machining comprises sawing the single integral profile beam to separate the single integral profile beam in the first profile beam part and the second profile beam part;
subsequently, out-feeding the first profile beam part with the out-feed transport system from the machining station to an intermediate position between the discharge position and the machining station, wherein a distance X between the intermediate position and the discharge position is variable, wherein during out-feeding, the first profile beam part and the second profile beam part are co-linearly aligned along the longitudinal axes thereof, wherein the longitudinal axes remain parallel to the transport direction axis; and
subsequently, in-feeding the second profile beam part in the machining station with the in-feed transport system over a distance Y and simultaneously out-feeding the first profile beam part over the distance X from the intermediate position to the discharge position, wherein during this simultaneous in-feeding and out-feeding the first profile beam part and the second profile beam part are co-linearly aligned along the longitudinal axes thereof, and wherein the longitudinal axes remain parallel to the transport direction axis,
wherein the distance Y is chosen such that the second profile beam part, after moving over the distance Y, is positioned relative to the machining station in a position in which a subsequent machining on the second profile beam part must be performed, and
wherein the out-feed transport system and the in-feed transport system simultaneously stop when the first profile beam part is at the discharge position and the second profile beam part is at the position in which the subsequent machining on the second profile beam part must be performed and the first profile beam is discharged from the out-feed transport.

9. The method according to claim 8, wherein an in-feed transport speed of the in-feed transport system is the same as an out-feed transport speed of the out-feed transport system and wherein the out-feeding of the first profile beam part is executed such that the distance X is equal to the distance Y.

10. The method according to claim 8, further comprising discharging the first profile beam from the discharge position and simultaneously machining the second profile beam part in the machining station.

11. The method according to claim 8, further comprising discharging the first profile beam part from the discharge position and simultaneously machining the second profile beam part in the machining station.

12. The method according to claim 11, wherein the machining at least the first profile beam part in the machining station comprises at least one of sawing, drilling, marking, scribing, thread tapping, counter sinking, and cutting milling.

* * * * *